United States Patent
Hasegawa

Patent Number: 5,897,185
Date of Patent: Apr. 27, 1999

[54] DATA PROJECTION DEVICE FOR CAMERAS WITH A LIGHT SHIELDING MASK FORMED BETWEEN LIQUID CRYSTAL CELL AND PHOTOGRAPHIC FILM

[75] Inventor: Hitoshi Hasegawa, Suwa, Japan

[73] Assignee: Seiko Epson Corporation, Tokyo, Japan

[21] Appl. No.: 08/894,985
[22] PCT Filed: Jan. 9, 1997
[86] PCT No.: PCT/JP97/00018
§ 371 Date: Aug. 29, 1997
§ 102(e) Date: Aug. 29, 1997
[87] PCT Pub. No.: WO97/25651
PCT Pub. Date: Jul. 17, 1997

[30] Foreign Application Priority Data

Jan. 10, 1996 [JP] Japan ................................ 8-002686

[51] Int. Cl.$^6$ ................................................ G02F 1/1333
[52] U.S. Cl. ................................ 349/110; 349/2; 396/316
[58] Field of Search ........................................ 349/110, 2

[56] References Cited

U.S. PATENT DOCUMENTS

| | | | |
|---|---|---|---|
| 4,232,956 | 11/1980 | Hashimoto et al. | 354/106 |
| 4,361,388 | 11/1982 | Mlcak et al. | 354/106 |
| 4,552,437 | 11/1985 | Gantenbrink et al. | 350/339 |
| 5,389,991 | 2/1995 | Naka et al. | 354/159 |
| 5,434,688 | 7/1995 | Saitoh et al. | 359/67 |
| 5,517,266 | 5/1996 | Funaki et al. | 354/106 |
| 5,648,998 | 7/1997 | Bauer et al. | 378/166 |
| 5,721,993 | 2/1998 | Ito et al. | 396/310 |

FOREIGN PATENT DOCUMENTS

| | | |
|---|---|---|
| 60-169832 | 9/1985 | Japan . |
| 63-214719 | 9/1988 | Japan . |
| 1-200340 | 8/1989 | Japan . |
| 5-061011 | 12/1997 | Japan . |

Primary Examiner—William L. Sikes
Assistant Examiner—Robert J. Hollingshead
Attorney, Agent, or Firm—Mark P. Watson

[57] ABSTRACT

In data projection display device (6) of data-projection device (1), outgoing-light side light-shielding mask (622) is provided on outgoing-light surface (602b) of outgoing-light side electrode substrate (602) of liquid crystal cell (604). Gap G among translucent segments (701–710) formed on light-shielding mask (622) is determined according to the thickness of outgoing-light side electrode substrate (602). If Go is used to indicate gap G that can produce a clear projection image when electrode substrate (602) having a thickness t=0.4 mm is used, a value obtained by adding the increase in diffusion [Δ=0.017 mm] when light is passing through the electrode substrate to gap Go is used as the gap G between the translucent segments of light-shielding mask (622) when an electrode substrate having a thickness t=0.55 mm is used. Specifying the gaps between the translucent segments of the light-shielding mask in this way makes it possible to increase the thickness of the electrode substrates to be used for the data projection liquid crystal display device of the data-projection device for cameras, without lowering the quality of the projected image.

12 Claims, 9 Drawing Sheets

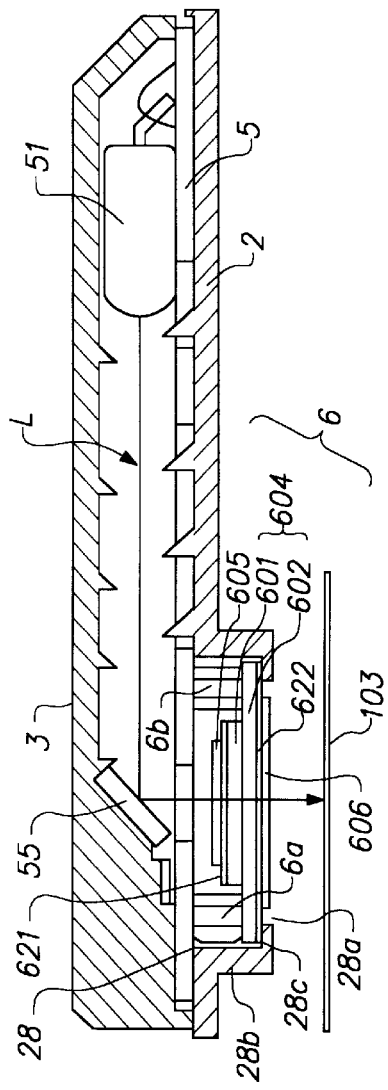
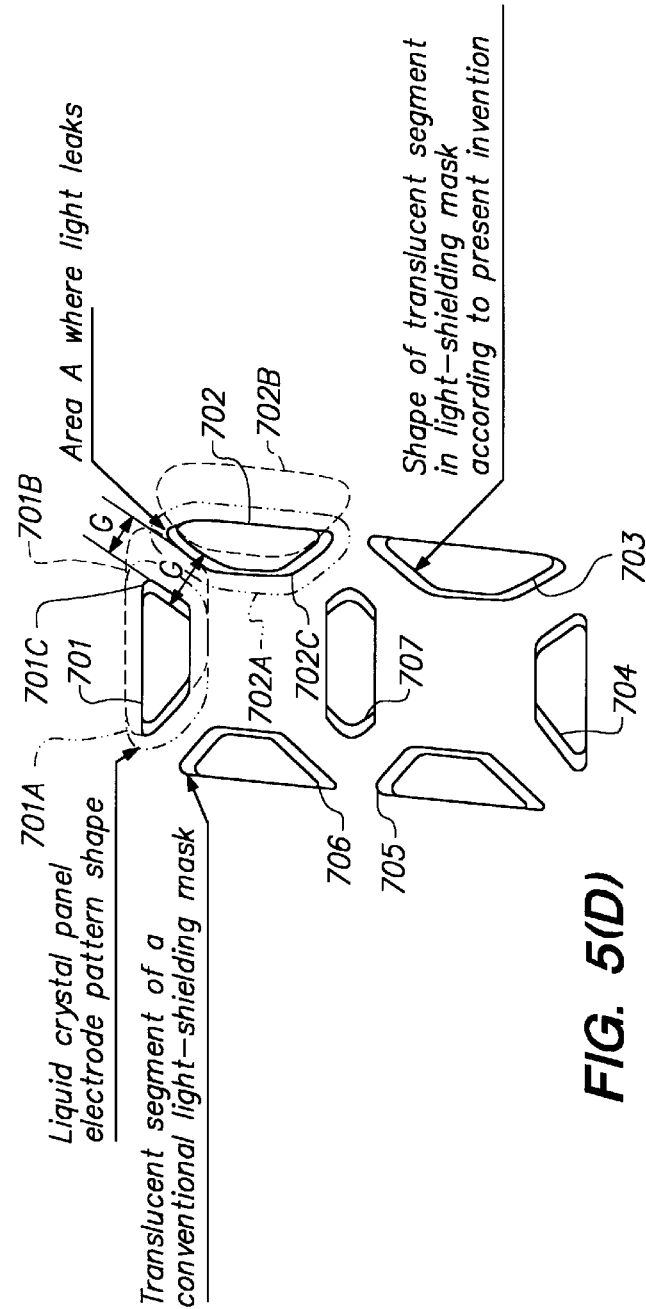
FIG. 3
FIG. 5(D)

DATA PROJECTION DEVICE FOR CAMERAS WITH A LIGHT SHIELDING MASK FORMED BETWEEN LIQUID CRYSTAL CELL AND PHOTOGRAPHIC FILM

BACKGROUND OF THE INVENTION

1. Field of the Invention

The invention relates to a data projection device used in cameras that projects a data pattern generated on a liquid crystal cell onto photographic film, and more particularly to a mechanism for maintaining the definition of the data image to be projected in this type of data projection device.

2. Description of the Related Art

FIG. 7 shows the general structure of a data projection device for projecting data such as a date onto photographic film inside a camera. As shown in this figure, data projection device for cameras 100 is installed in the space between backlid 101 of the camera main unit and platen 102 positioned roughly in parallel to said backlid 101 inside the camera main unit. The surface of platen 102 opposite from backlid 101 is the film installation area along which photographic film 103 is to be installed. Data such as a photographing date can be projected onto this photographic film 103 through opening 102a provided in platen 102.

Data projection device for cameras 100 has a structure in which circuit board 114 on which IC chip 113 is mounted, monitoring liquid crystal display device 115, and data projection liquid crystal display 116 are all sandwiched between first frame plate 111 and second frame plate 112. The two frame plates 111 and 112 are fastened to each other by putting multiple dowels 112a formed on the second frame plate side through through-holes 111a formed on the first frame plate side and flattening their tops.

Monitoring liquid crystal display device 115 for displaying various types of data for the operator is installed and fastened to the inside of second frame plate 112, cover glass 121 is installed on the surface of said display device 115 to protect it, and the surface of the cover glass 121 is exposed to the outside through opening 101a provided in camera backlid 101. Data projection liquid crystal display device 116 located in the position corresponding to opening 102a provided in back plate 102, is installed on the inside of first frame plate 111.

IC chip 113 mounted on circuit board 114 is covered and protected by molding material 122. Drive signals are supplied from the circuit board 114 to monitoring liquid crystal display device 115 via flexible connector plate 123. This connector plate 123 functions as the support plate for pressing display device 115 from the back side toward second frame plate 112 and securing it therein.

Spacer plate 124 prevents connector plate 123 from falling, and this plate 124 also prevents display device 116 from tilting.

Likewise, data projection liquid crystal display device 116 located on the opposite side is electrically connected to circuit board 114 by a pair of connector plates 125 and 126, and is pressed toward first frame plate 111 by these connector plates. Note that data projection device 100 having this configuration is fastened inside the camera main unit by fastening plate 127.

FIG. 8(A) schematically shows a data-projection optical system equipped with data projection liquid crystal display device 116. Various components comprising this optical system are also integrated into data projection device 100.

Data projection liquid crystal display device 116 is equipped with liquid crystal cell 201 in which liquid crystals are sealed between a pair of electrode substrates, and can form the data pattern to be projected into photographic film 103 as a translucent area. The light emitted by light source lamp 202 is guided to liquid crystal cell 201 via reflection mirror 203, and is then guided to photographic film 103 after excess light is eliminated by liquid crystal cell 201. As a result, a data image corresponding to the data pattern is projected onto photographic film 103.

Since liquid crystal cell 201 alone cannot sufficiently eliminate excess light, the data image projected onto photographic film 103 via the translucent area of liquid crystal cell 201 sometimes has unclear edges. In order to avoid this problem, a conventional method eliminates excess light by placing light-shielding mask 206 between light source lamp 202 and liquid crystal cell 201.

As shown in FIG. 8(B), light-shielding mask 206 provided for this purpose is provided with translucent area 208 defined by multiple translucent segments 208a having shapes that correspond to the individual segments 207 on the side of liquid crystal cells 201 for forming data patterns, and with light-shielding area 209 formed in the rest of the area. Therefore, by providing this light-shielding mask 206, excess light is eliminated from the light that enters liquid crystal cell 201.

Note that, for light-shielding mask 206, a metal film is usually formed on a glass substrate according to the specified pattern using a film-formation method, such as plating and vapor deposition, and the area without the metal film is used as translucent area 208.

Because the data projection device for cameras having the aforementioned configuration is equipped with light-shielding mask 206, excess light can be eliminated from the light that enters liquid crystal cell 201. However, light is also diffused when passing through liquid crystal cell 201. Consequently, data image definition deterioration due to this kind of diffusion still remains.

To avoid this problem, one possibility is to locate light-shielding mask 206 on the outgoing-light side of liquid crystal cell 201. This can prevent data image definition deterioration that will be caused by the diffusion of the light passing through the liquid crystal cell.

Note that glass substrates are usually used for the pair of electrode substrates which comprise liquid crystal cell 201. If thick substrates can be used for these glass substrates, their processability during manufacturing will improve, resulting in higher yields which is desirable. However, since the light-shielding mask is located on the outgoing-light side of the liquid crystal cell, light is still diffused after passing the translucent area formed by the liquid crystals sealed between the pair of electrode substrates and before reaching the light-shielding mask by passing through the glass substrate on the outgoing-light side.

As explained above, merely increasing the thickness of the glass substrates to improve yield also increases the amount of light diffused when passing through said glass substrates, in proportion to the thickness increase. As a result, the definition of the data image to be projected onto the photographic film deteriorates, which is undesirable.

OBJECTS OF THE INVENTION

The objects of the invention are to adopt in a data projection device for cameras, a configuration in which a light-shielding mask is positioned on the outgoing-light side of the liquid crystal cell which forms the data pattern to be projected onto the photographic film, and to propose a mechanism that does not lower the definition of the data image even when the thickness of the electrode substrates of the liquid crystal cell is increased.

SUMMARY OF THE INVENTION

In order to solve the aforementioned problems, a data-projection device for cameras, having a liquid crystal cell that forms the data pattern to be projected onto the data-projection surface of the photographic film as a translucent area, according to the orientation of the liquid crystals positioned in the light path for guiding the light emitted from a light source to the data projection surface of the photographic film positioned in the film positioning area, and sealed between a pair of electrode substrates, uses a configuration in which a light-shielding mask that is positioned closer to the photographic film positioning surface than to the liquid crystal cell in the optical path, and in which the area that overlaps the data pattern formation area consists of multiple translucent segments. Furthermore, the gaps between adjacent translucent segments in the light-shielding mask are determined by considering the amount of light diffused which changes according to the thickness of the electrode substrate on the outgoing-light side of said liquid crystal cell.

In a data projection device for cameras having such a configuration, the light-shielding mask is positioned on the outgoing-light side of said liquid crystal cell. Therefore, excess light is eliminated from the light that has passed through the translucent area of the liquid crystal cell when it passes through the light-shielding mask, resulting in a high-definition projected image.

Moreover, the gaps between adjacent translucent segments in the light-shielding mask are determined based on the amount of light diffused when the light passes through the electrode substrate on the outgoing-light side of the liquid crystal cell. For example, when a thick electrode substrate is used, more light is diffused than when a thin electrode substrate is used. In such a case, the gaps between the translucent segments will be wider in proportion to the increase in the diffused light, according to the invention. As a result, it is possible to prevent the problem in which the light that has passed through each segment in the translucent area of the liquid crystal cell leaks to the photographic film by passing through the translucent segment adjacent to the corresponding translucent segment of the light-shielding mask. Therefore, the electrode substrate can be made thicker to improve both its manufacturability and yield while maintaining the definition of the projected image.

Note that the amount of the aforementioned diffused light increases as the distance increases from the optical axis of the light emitted by the light source. Therefore, the gaps between said translucent segments in said light-shielding mask should preferably be determined based on the amount of said light diffused by said translucent segment that is farthest from the optical axis of the light emitted by the light source.

On the other hand, instead of forming the light-shielding mask on the surface on the outgoing-light side of said electrode substrate positioned on the outgoing-light side of said liquid crystal cell, it is also possible to form the light-shielding mask on the surface on the outgoing-light side of a polarizing plate positioned on the surface on the outgoing-light side of the electrode substrate positioned on the outgoing-light side. In this case, the gaps between the adjacent translucent segments in said light-shielding mask can be determined based on the amount of light diffused which changes according to the thickness of the electrode substrate on the outgoing-light side of said liquid crystal cell and the thickness of the polarizing plate.

BRIEF DESCRIPTION OF THE DRAWINGS

In the drawings wherein like reference symbols refer to like parts

FIG. 3 is a schematic cross-section obtained along line III—III in FIG. 1.

DESCRIPTION OF THE PREFERRED EMBODIMENTS

Figure 1:
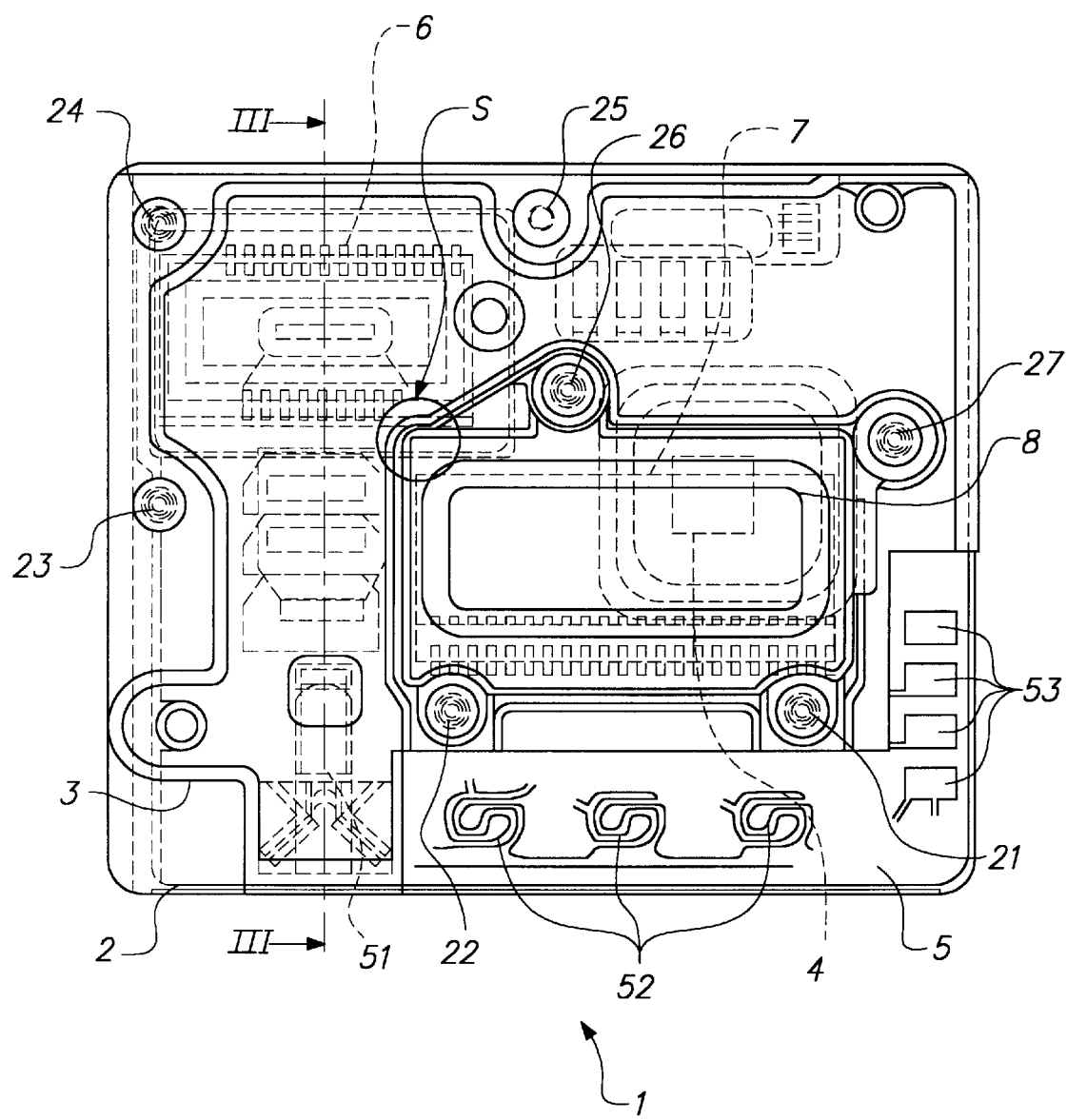
FIG. 1 is a schematic top view diagram of the data projection device for cameras, related to an embodiment of the invention.
Figure 2:
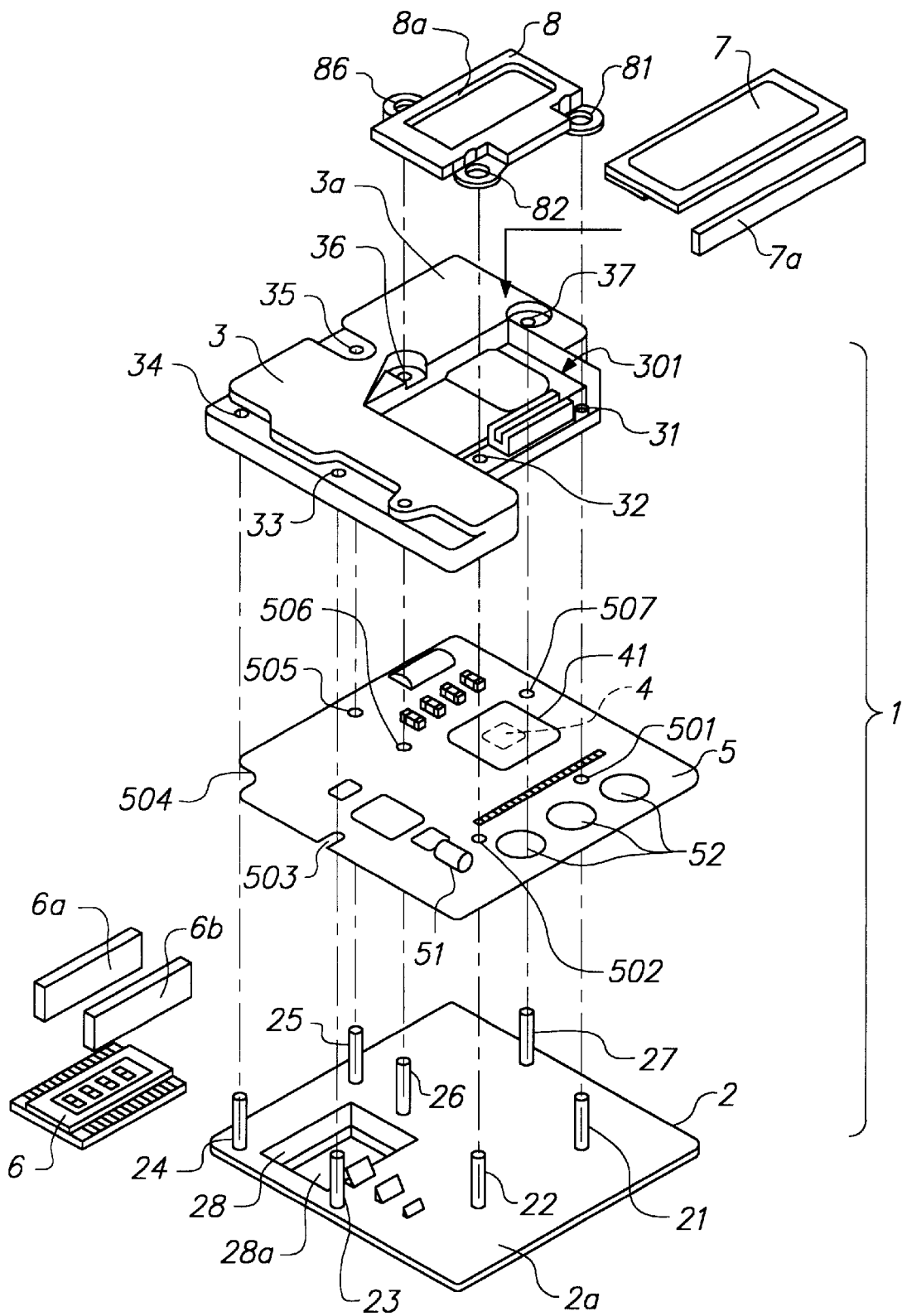
FIG. 2 is a partial perspective diagram of the device shown in FIG. 1.

FIG. 1 is the top view diagram of an embodiment of the data projection device for cameras, to which the invention has been applied. FIG. 2 is a partial perspective diagram of this device. As shown in these figures, data-projection device for cameras 1 in this embodiment has a structure in which circuit board 5 on which IC chip 4 is mounted is sandwiched between first frame plate 2 and second frame plate 3.

Seven dowels 21–27, for example, are vertically formed as part of first frame plate 2 on its inside surface 2a. Furthermore, rectangular concave area 28 is formed, in which rectangular opening 28a is formed. This concave area 28 is where data projection liquid crystal display device 6 is to be installed. This liquid crystal display device 6 is electrically connected to circuit board 5 via two connector plates 6a and 6b.

In addition to IC chip 4, data projection lamp 51, switch group 52, terminal group 53 for connecting to the camera main unit, etc. are mounted on circuit board 5. The surface of IC chip 4 is covered and protected by molding material 41. Through-holes or lead-through notches 501–507 for guiding through dowels 21–27 formed on first frame plate 2 are formed on circuit board 5.

Through-holes 31–37, through which said dowels 21–27 formed on first frame plate 2 pass, are formed on second frame plate 3. Mounting area 301 for mounting monitoring liquid crystal display device 7 is formed on the outside surface 3a of the area of second frame plate 3 that roughly corresponds to IC chip 4. Display device 7 is mounted on this mounting area 301 from outside, and then display device fastening frame 8 is installed from the top.

Through-holes 81, 82, and 86 for dowels 21, 22, and 26 are formed on the fastening frame 8. Note that monitoring liquid crystal display device 7 is electrically connected to circuit board 5 via connector plate 7a.

Data signals are supplied from IC chip 4 on circuit board 5 to data projection liquid crystal display device 6 via connector plates 6a and 6b. This display device has a configuration in which multiple 7-segment display areas, for example, are arranged, and each display area forms the shape of one character of the data to be projected. As is known, the areas corresponding to the projection data become translucent (ON segments) and the rest of the areas are maintained as non-translucent (OFF segments). Therefore, when the light emitted from lamp 51 passes through the translucent areas, characters, etc. corresponding to the projection data are projected onto the photographic film.

Data-projection device for cameras 1 in this embodiment has a one-directional assembly structure in which all of the aforementioned configuration components can be installed from one side. That is, as shown in FIG. 2, first frame plate 2 is first placed with its internal surface 2a facing up. From this state, data projection liquid crystal display device 6 is installed in concave area 28 which is the display device mounting area of first frame plate 2, and then two connector plates 6a and 6b are placed on top.

Next, circuit board 5 is positioned so that individual dowels 21–27 of first frame plate 2 are aligned with corresponding through-holes or lead-through notches 501–507, and from this state, circuit board 5 is overlaid on top of first frame plate 2. Next, in the same manner, second frame plate 3 is positioned so that individual dowels 21–27 of first frame plate 2 go into corresponding through-holes 31–37, and from this state, second frame plate 3 is overlaid on top of circuit board 5.

From this state, connector plate 7a is first installed in display device mounting area 301 formed on external surface 3a of second frame plate 3, and then monitoring liquid crystal display device 7 is installed on top. After the installation, display device fastening frame 8 is overlaid on top of display device 7 with dowels 21, 22, and 26 aligned with through-holes 81, 82, and 86.

In this way, various configuration components are installed on first frame plate 2 from the same side. Afterwards, the tips of dowels 21–27 are crimped by either mechanically or thermally flattening them.

Figure 7:
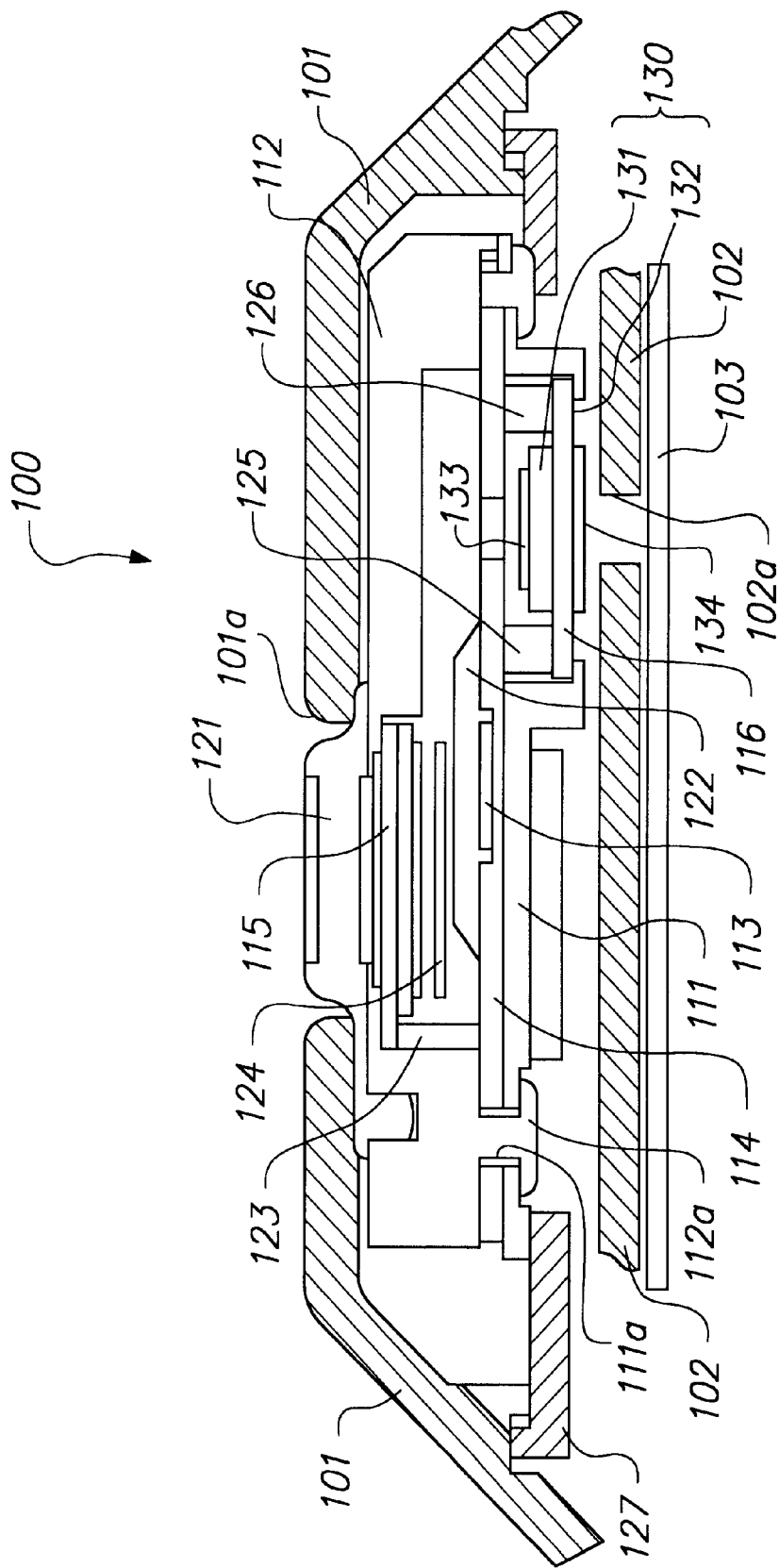
FIG. 7 is a schematic cross-section showing the structure of a conventional data projection device for cameras.
Figure 8B:
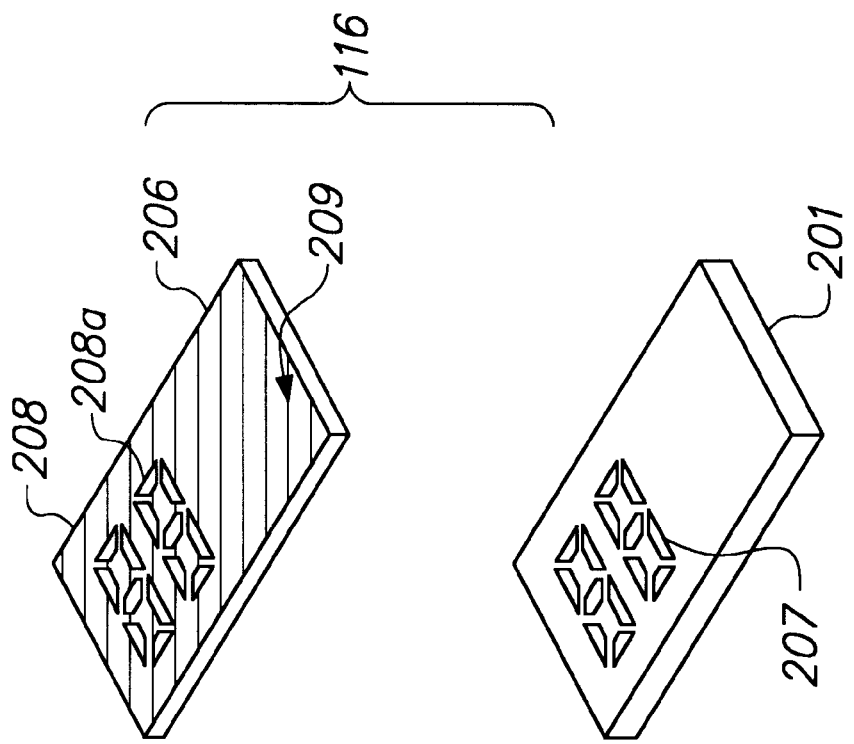
FIG. 8 schematically shows the data-projection optical system incorporated in the data projection device for cameras shown in FIG. 7.
Figure 8A:
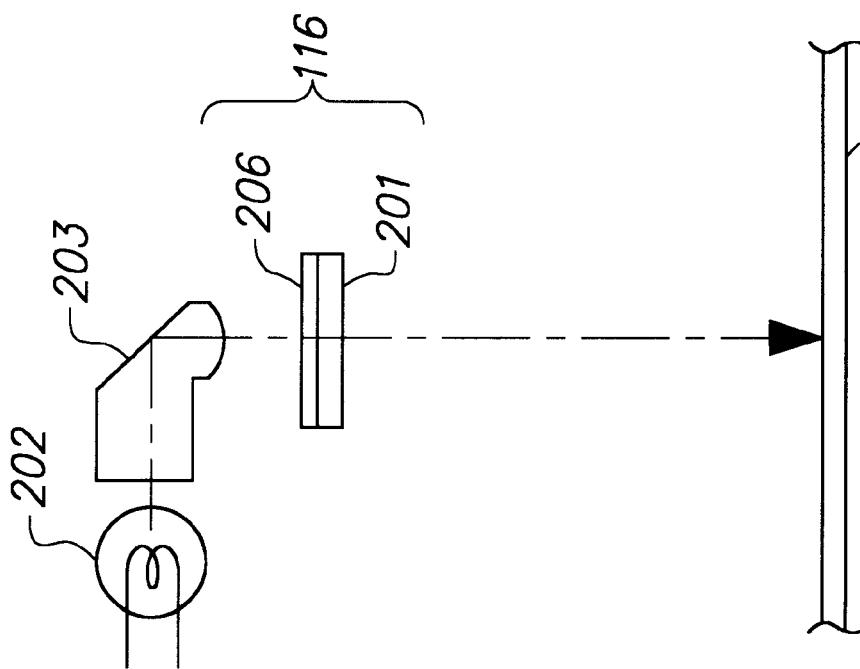

Note that data-projection device for cameras 1 in this embodiment is also designed to be installed in and fastened to the mounting area formed on the camera main unit, as in the case of conventional device 100 shown in FIG. 7. In the installed state, monitoring liquid crystal display device 7 is visible through opening 101a of backlid 101 of the camera main unit, as in FIG. 7, and data projection liquid crystal display device 6 is set in the position that corresponds to film 103 via opening 102a of platen 102 inside the camera main unit.

FIG. 3 shows a cross-section of the data-projection optical system shown in FIG. 1, obtained along line III—III. As shown in this figure, light is emitted from lamp 51 installed on circuit board 5 nearly in parallel to the surface of the circuit board. Reflection mirror 55 is installed at a 45-degree angle to optical path L in the area of second frame plate 3 that corresponds to the installation position of data projection liquid crystal display device 6, and optical path L is perpendicularly bent by this mirror 55 toward liquid crystal display device 6. Of the light that is bent by mirror 55, the light that passes through data projection liquid crystal display device 6 passes through opening 102a of platen 102 of the camera main unit and reaches photographic film 103 positioned on the opposite side.

Figure 4A:
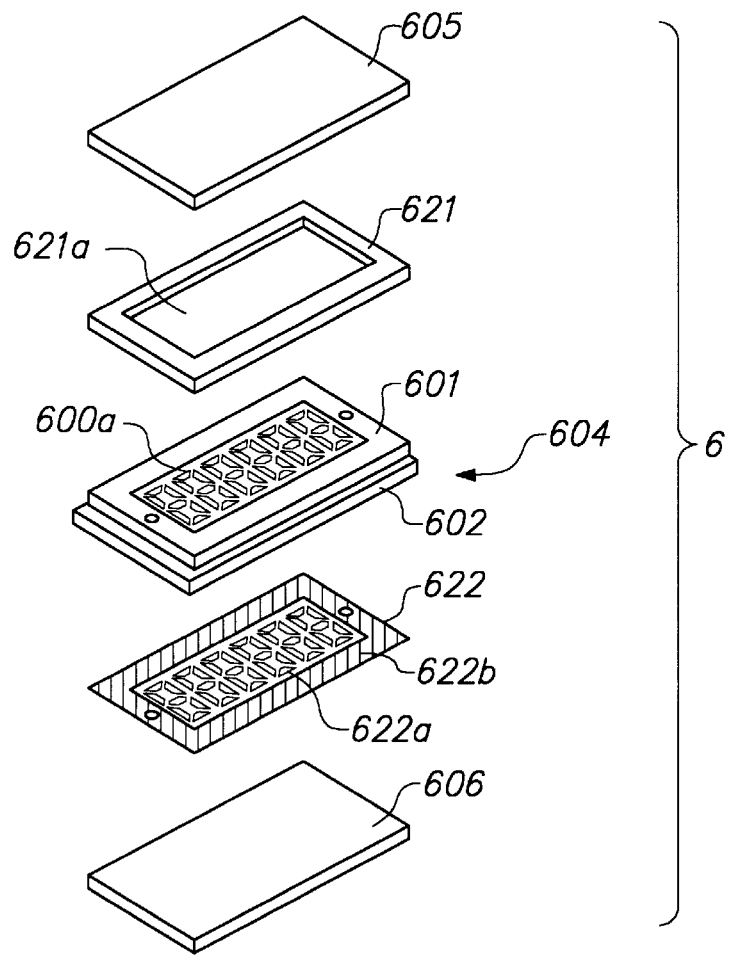
FIG. 4 shows the data projection display device of the device shown in FIG. 1; (A) is a perspective diagram of the display area; and (B) shows its a cross-section.
Figure 4B:
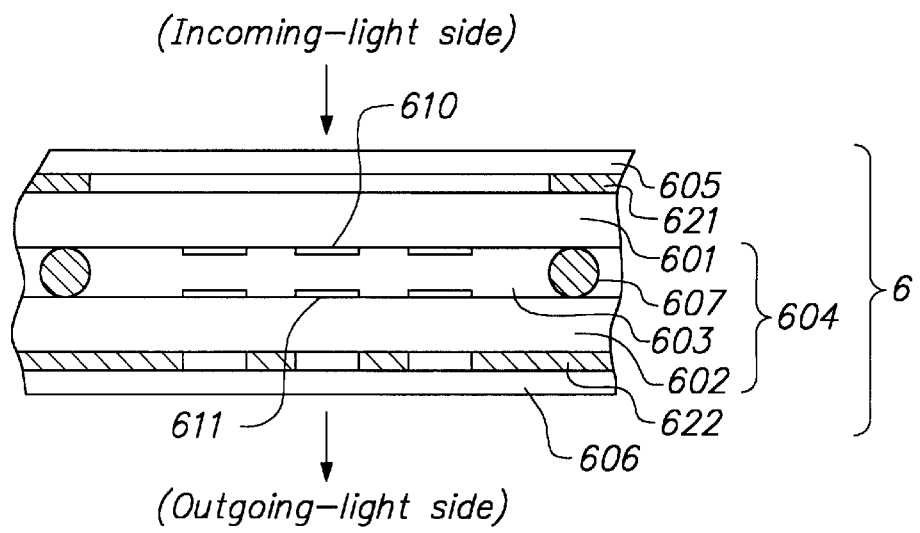

The configuration of data projection liquid crystal display device 6 of this embodiment will now be explained with references to FIG. 3 and FIG. 4. Data projection liquid crystal display device 6 is a negative type, and thus the lit areas become translucent. This data projection liquid crystal display device 6 is equipped with liquid crystal cell 604 in which liquid crystals 603 (see FIG. 4 (B)) are sealed between a pair of electrode substrates 601 and 602; incoming-light side polarizing plate 605 positioned on the light source side relative to this liquid crystal cell 604, i.e., on the lamp 51 side; and with outgoing-light side polarizing plate 606 positioned on the photographic film 103 side relative to liquid crystal cell 604.

A more detailed explanation follows. In liquid crystal cell 604, liquid crystals 603 are sealed between electrode substrate 601 positioned on the incoming-light side (hereafter referred to as "incoming-light side electrode substrate") and electrode substrate 602 positioned on the outgoing-light side (hereafter referred to as "outgoing-light side electrode substrate"), and at the same time, opposing translucent electrodes 610 and 611 for driving liquid crystals are formed on the internal surfaces (i.e., the sides that seal liquid crystals) of incoming-light side electrode substrate 601 and outgoing-light side electrode substrate 602, respectively.

Liquid crystals 603 are sealed between incoming-light side electrode substrate 601 and outgoing-light side electrode substrate 602 by sealing material 607. The aforementioned opposing translucent electrodes 610 and 611 form a configuration in which multiple 7-segment display areas 600a are arranged. Note that a single character is displayed using seven segments.

In order to eliminate undesirable light passing through the areas other than segment display areas 600a and to prevent missing light due to liquid crystal polarization failures, this embodiment is equipped with incoming-light side light-shielding mask 621 and outgoing-light side light-shielding mask 622. Incoming-light side light-shielding mask 621 is provided with rectangular window 621a which is large enough to accommodate segment display area 600a. In contrast, in outgoing-light side light-shielding mask 622, translucent area 622a is formed in the area that overlaps segment display area 600a where the data pattern will be formed by liquid crystal cell 604, and the rest of the area is left as light-shielding area 622b, as can be seen from FIG. 4(A). In this figure, light-shielding area 622b is indicated by slanted lines while translucent area 622a is left as a voided area. Outgoing-light side light-shielding mask 622 is formed using metal vapor deposition film of nickel, chrome, etc., for example, or using metal plating.

Figures 5A, 5B:
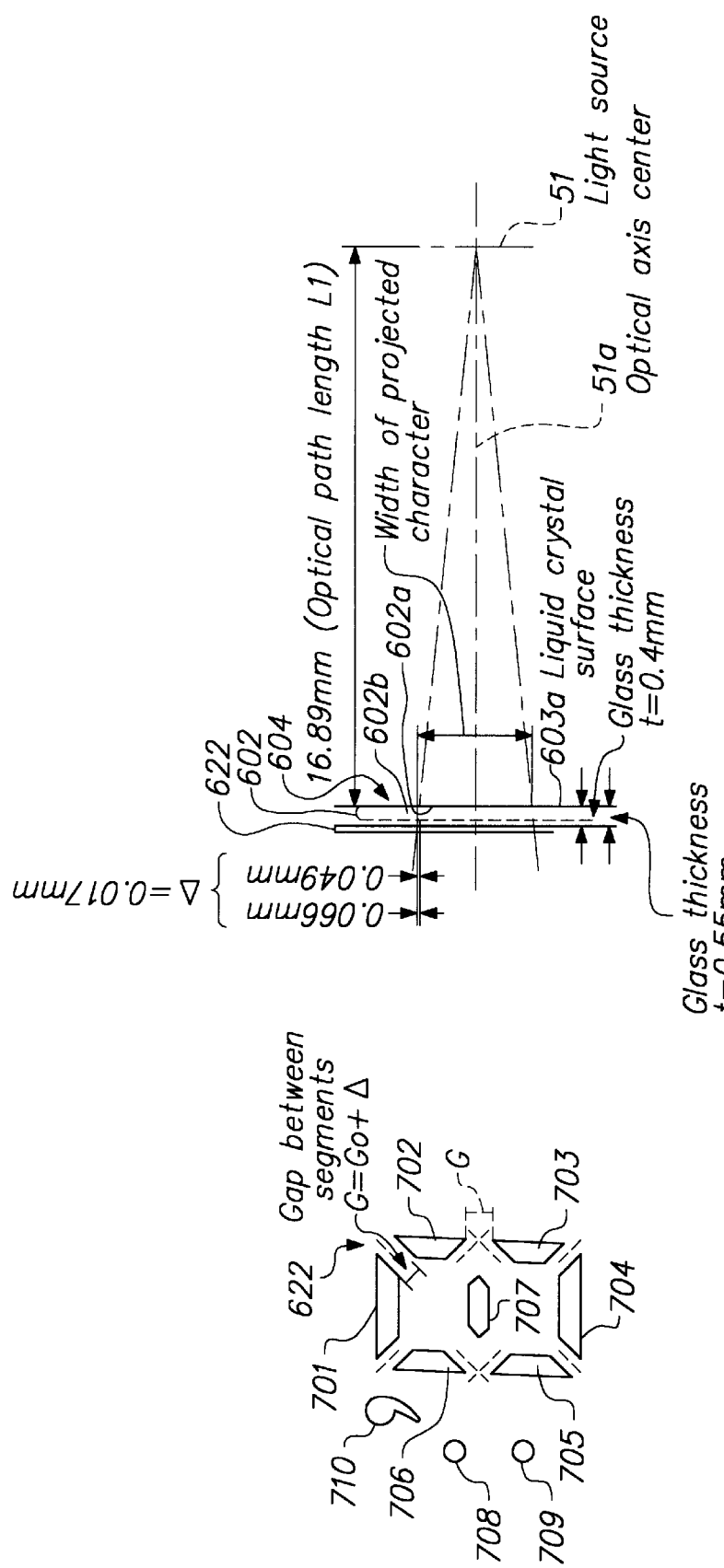
FIG. 5 shows the method in which the gaps between translucent segments on the light-shielding mask are determined; (A) shows the pattern of the segments formed in the data projection display device shown in FIG. 4; (B) shows the method in which the gaps between translucent segments on the light-shielding mask are determined; (C) shows an enlarged view of part of (B); and (D) shows the effect of the translucent segment gap determination method according to the invention.

FIG. 5(A) shows a magnified view of part of translucent area 622a which is formed in outgoing-light side light-shielding mask 622 and which consists of translucent segments. In this figure, translucent segments 701 through 707 constitute a translucent segment group corresponding to one character. Additionally, two translucent segments 708 and 709 for displaying a colon, and one translucent segment 710 for displaying a comma are provided. This group of a total of 10 translucent segments constitutes one set, and a translucent area consisting of multiple sets of these groups is formed as translucent area 622a in outgoing-light sidelight-shielding mask 622.

Figure 5C:
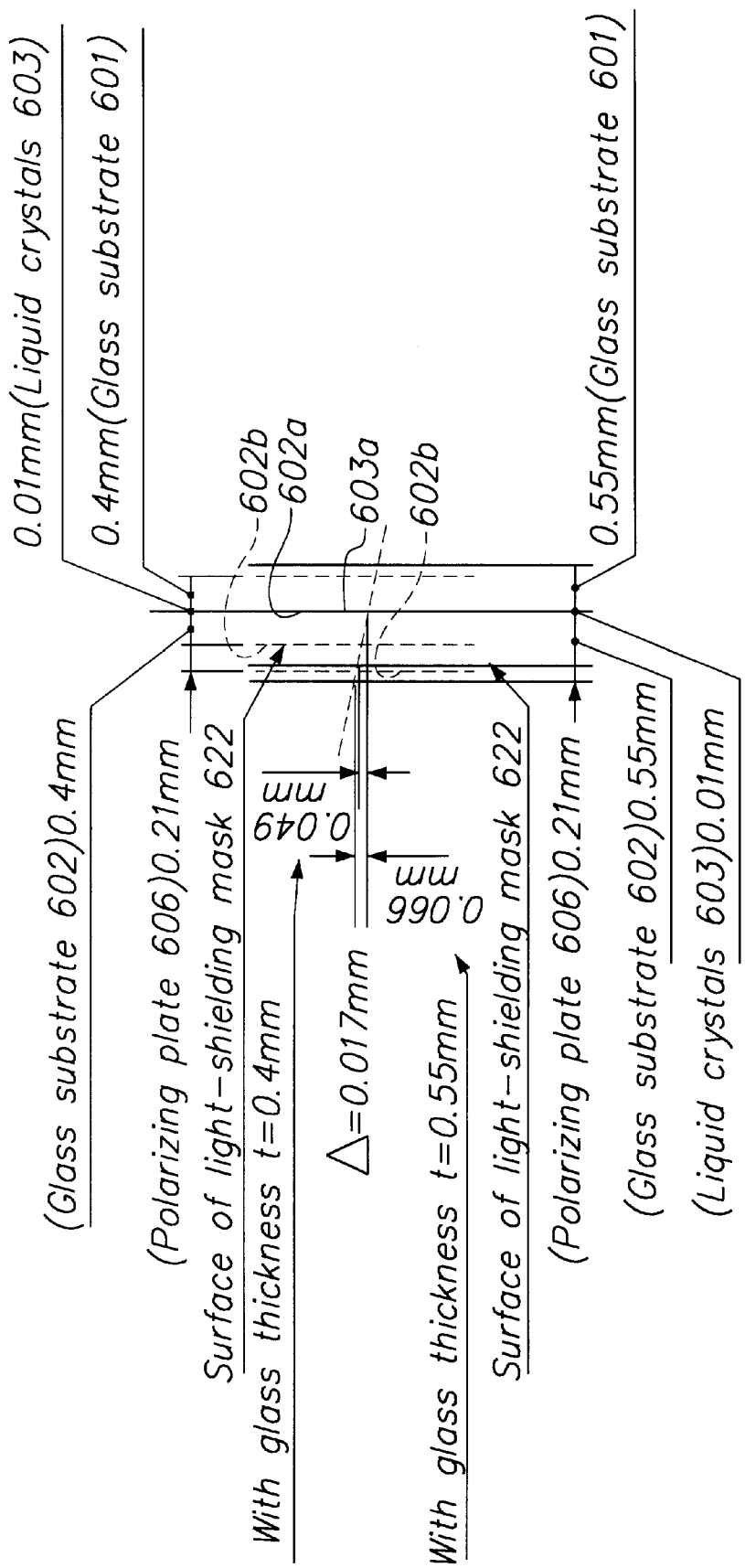

In this embodiment, gap G in translucent segment groups formed in outgoing-light side light-shielding mask 622 is determined as explained below. Note that gap G indicates the narrowest dimension of the gaps between adjacent translucent segments, and usually is the interval between adjacent translucent segments in seven translucent segments 701–707. For example, as shown in FIG. 5 (A), the interval between translucent segments 701 and 702 is used for gap G. Moreover, gap G is calculated for translucent segments located farthest from optical axis center 51a of the light emitted from light source 51. The reason for this is as follows. Because the amount of light diffused is the largest for the translucent segments located farthest from optical axis center 51a, using the gap G calculated in this position as the gaps for translucent segments located elsewhere ensures that problems associated with diffused light can be definitely avoided.

The procedure for determining this gap G will be explained with references to FIGS. 5(B) and (C). As shown in these figures, length L1 of the optical path from light source lamp 51 to outgoing-light side surface 603a of liquid crystals 603 which comprise liquid crystal cell 604 of liquid crystal display device 6 is set at a constant value. For example, it is fixed at 16.89 mm. Incoming-light side electrode substrate 601 and outgoing-light side electrode substrate 602 of liquid crystal cell 604 that are currently in general use have a thickness of 0.4 mm (substrates having a thickness of 0.4 mm are shown in broken lines in the figure). In this case, the left-to-right width of the font for the data to be projected, which is specified by liquid crystals 603 of liquid crystal cell 604, is generally set to 4.0 mm.

When the dimensions of the various areas are specified as described above, the following event occurs. While light is passing through outgoing-light side electrode substrate 602 after passing through boundary (liquid crystal surface) 603a of liquid crystals 603 on the outgoing-light side, the transmission light pattern at outgoing-light surface 602b of outgoing-light side electrode substrate 602 is diffused by 0.049 mm more than the transmission light pattern at incoming-light surface 602a in all directions (top, bottom, left, and right). In this case, gap G of translucent segments 701–702 of outgoing-light side light-shielding mask 622 can be set to Go=0.072 mm which is obtained by adding the diffusion amount to the basic required gap of 0.023 mm. With this setting, when the light that has passed through the ON segments of liquid crystal cell 604 passes through outgoing-light side light-shielding mask 622, it is possible to reliably prevent this light from passing through the translucent segments that are adjacent to the translucent segments that correspond to the ON segments and leaking to photographic film 103.

In contrast, if a thick glass substrate is used as outgoing-light side electrode substrate 602, e.g., one having a thickness of 0.55 mm (the figure shows a 0.55 mm thick substrate in solid lines), the transmission light pattern obtained via liquid crystal cell 604 diffuses by 0.066 mm when passing through outgoing-light side electrode substrate 602. That is, the diffusion amount increases by 0.017 mm compared to the case in which outgoing-light side electrode substrate 602 having a thickness of 0.4 mm is used. Because of this increase Δ=0.017 mm, Go=0.072 mm is no longer sufficient as gap G of translucent segments 701–707 of outgoing-light side light-shielding mask 622.

For example, if it is assumed that translucent segment 701 in outgoing-light side light-shielding mask 622 is a translucent area corresponding to the ON segment of liquid crystal cell 604 and the adjacent translucent segment 702 is a translucent area corresponding to the OFF segment of liquid crystal cell 604, the light that should pass through only translucent segment 701 diffuses when passing through outgoing-light side electrode substrate 602, and as a result, reaches the adjacent translucent segment 702, passes through this area, and leaks to photographic film 103. Consequently, an unnecessary dot pattern is projected onto photographic film 103 by this leaked light. Or, a pattern in which adjacent segments are connected will be projected.

The occurrence of such a problem will be explained with a reference to FIG. 5 (D). In this figure, the pattern shape of the electrode of the liquid crystal cell that corresponds to translucent segment 701 in light-shielding mask 622 is indicated by the two-dot chain line 701A and the pattern shape of the electrode of the liquid crystal cell that corresponds to the adjacent translucent segment 702 is also indicated by the two-dot chain line 702A. Because the light that passes through these electrode patterns 701A and 702A diffuses while passing through outgoing-light side electrode substrate 602 as explained above, the areas on outgoing-light side light-shielding mask 622 illuminated by the light passing through these electrode patterns 701A and 702A are positioned and shaped as indicated by broken lines 701B and 702B, respectively. That is, these areas generally tend to move away from the optical axis center and tend to become larger.

If the gap between translucent segments 701 and 702 in outgoing-light side light-shielding mask 622 is narrow as indicated by G', i.e., these segments have the positional relationship indicated by thin lines 701C and 702C, part of area 701B illuminated by the light entering translucent segment 701C (area indicated by a slanted line A in the figure) ends up overlapping the adjacent translucent segment 702C. As a result, unnecessary dots are projected onto photographic film 103 by the light leaking from said translucent segment 702C.

However, in the case of the present embodiment, gap G is determined so that translucent segments 701 and 702 have the positional relationship indicated by thick lines in the figure, by taking into consideration the diffusion that occurs when the light is passing through outgoing-light side electrode substrate 602 as explained above. That is, gap G is widened by the increase, Δ, in the light diffusion, i.e., Δ=0.017 mm in the above example. In the above example, segment gap G is set to Go=Δ of 0.089 mm (=0.072+0.017 mm). Therefore, an area illuminated by the light entering a translucent segment can be prevented from overlapping the adjacent translucent segment, and unnecessary dots, etc. can be prevented from being projected onto the photographic film. Note that FIG. 5(D) shows the shapes of other translucent segments 703–707 in thick lines and the corresponding translucent segments in a conventional case are indicated by thin lines.

As explained above, the present embodiment can prevent the projected image from becoming unclear even when thick electrode substrates are used for liquid crystal cell 604. As a result, the use of thick electrode substrates offers the advantage of improved manufacturability and yield for the liquid crystal cell.

Note that increasing the thickness of the electrode substrates also increases the amount of passing light that is diffused, and therefore translucent segment gap G of outgoing-light side light-shielding mask 622 must also be increased accordingly. However, making gap G too large will make the characters, etc. that are actually projected onto photographic film 103 unfit for recognition. For example, it has been confirmed that sufficiently acceptable character data can be projected onto photographic film 103 using electrode substrates of up to 0.55 mm, if the dimensions of the individual areas are set as in the example shown in FIG. 5(B).

Figure 6A:
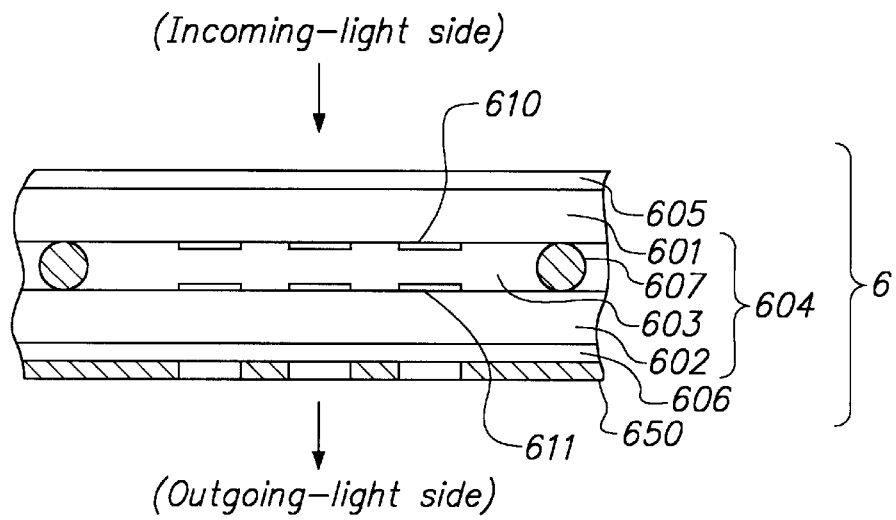
FIG. 6(A) shows a cross-section of another configuration example of the data projection liquid crystal display device.

Next, FIG. 6(A) shows another configuration example of data projection liquid crystal display device 6. Data projection liquid crystal display device 6 shown here is different in that outgoing-light side polarizing plate 650 which corresponds to outgoing-light side light-shielding mask 622 in the earlier example is positioned on the outgoing-light side surface of outgoing-side polarizing plate 606. Incoming-light side light-shielding mask 621 is not provided here. This outgoing-light side polarizing plate 650 can be formed using photoetching, for example. When outgoing-light side polarizing plate 650 is located in the aforementioned position, it is necessary to consider the effects of outgoing-light side electrode substrate 602 as well as said outgoing-light side polarizing plate 650 on light diffusion.

Note that data projection liquid crystal display device 6 shown in FIG. 6(A) uses the same symbols as those used for data projection liquid crystal display device 6 in the earlier example for the corresponding areas, and their explanations are omitted.

The procedure for determining gap G between the translucent segments formed in outgoing-light side light-shielding mask 650 will be explained with reference to FIG. 6(B). As shown in this figure, length L1 of the optical path from light source lamp 51 to outgoing-light side surface 603a of liquid crystals 603 which comprise liquid crystal cell 604 of liquid crystal display device 6 is set at a constant value. For example, it is set to 16.89 mm. Incoming-light side electrode substrate 601 and outgoing-light side electrode substrate 602 of liquid crystal cell 604 that is currently in general use have a thickness of 0.4 mm. In this case, the left-to-right width of the font for the data to be projected, which is specified by liquid crystals 603 of liquid crystal cell 604, is generally set to 2.814 mm.

When the dimensions of the various areas are specified as described above, the following event occurs. While light is passing through outgoing-light side electrode substrate 602 and outgoing-light side polarizing plate 650 after passing through boundary (liquid crystal surface) 603a of liquid crystals 603 on the outgoing-light side, the transmission light pattern at outgoing-light surface 650a of outgoing-light side electrode substrate 602 is diffused by 0.072 mm more than the transmission light pattern at incoming-light surface 602a of the substrate in all directions (top, bottom, left, and right). In this case, gap G of translucent segments 701–702 of outgoing-light side light-shielding mask 622 can be set to Go=0.095 mm which is obtained by adding the light diffusion amount to the gap of 0.023 mm basically required between translucent segments. With this setting, when the light that has passed through the ON segments of liquid crystal cell 604 passes through outgoing-light side polarizing plate 650, it is possible to reliably prevent this light from passing through the translucent segments that are adjacent to the translucent segments that correspond to the ON segments and leaking to photographic film 103.

Figure 6B:
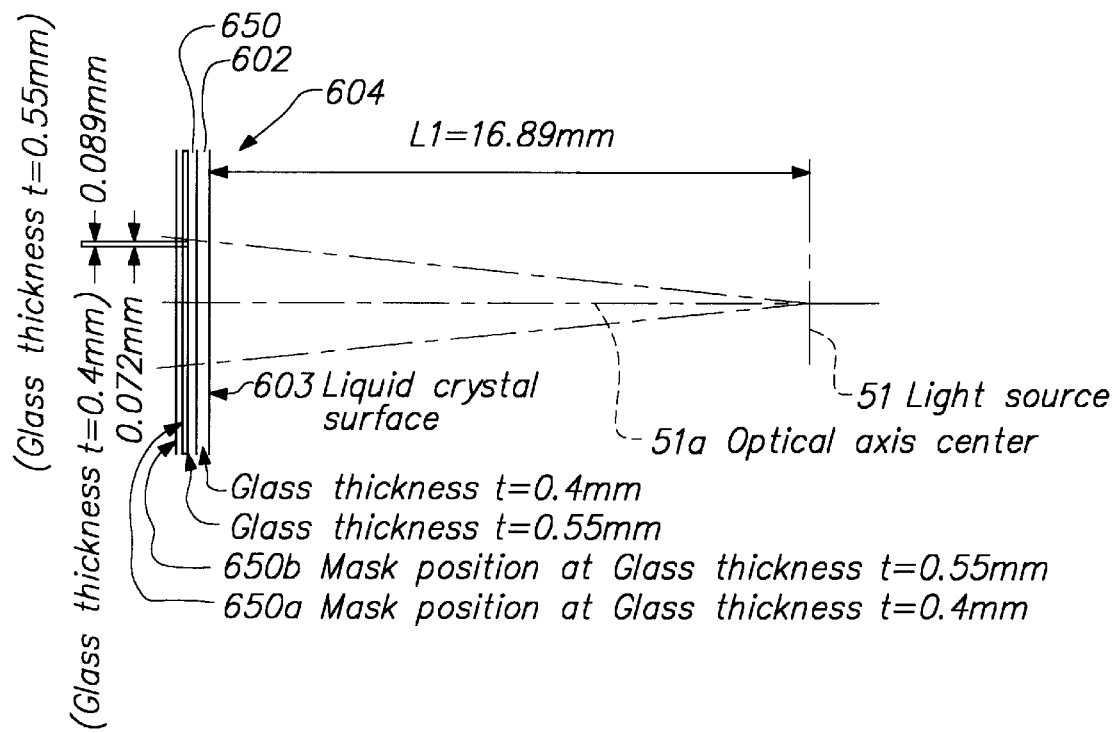
FIG. 6(B) shows the method in which the gaps between translucent segments on the light-shielding mask are determined.

In contrast, if a thick glass substrate is used as outgoing-light side electrode substrate 602, e.g., one having a thickness of 0.55 mm, the transmission light pattern obtained via liquid crystal cell 604 diffuses by 0.089 mm at outgoing-light side surface 650b when passing through outgoing-light side electrode substrate 602 and outgoing-light side polarizing plate 650, as shown in FIG. 6(B). That is, the diffusion amount increases by 0.017 mm compared to the case in which outgoing-light side electrode substrate 602 having a thickness of 0.4 mm is used. Because of this increase Δ=0.017 mm, Go=0.095 mm is no longer sufficient as gap G of translucent segments 701–707 of outgoing-light side light-shielding mask 622.

For example, if it is assumed that translucent segment 701 in outgoing-light side polarizing plate 650 is a translucent area corresponding to the ON segment of liquid crystal cell 604 and the adjacent translucent segment 702 is a translucent area corresponding to the OFF segment of liquid crystal cell 604, the light that should pass through only translucent segment 701 diffuses when passing through outgoing-light side electrode substrate 602 and outgoing-light side polarizing plate 650, and as a result, reaches the adjacent translucent segment 702, passes through this area, and leaks to photographic film 103.

To avoid such a problem, in the present embodiment, gap G is widened by the increase, Δ, in the light diffusion, i.e., Δ=0.017 mm in the above example. In the above example, segment gap G is set to Go+Δ of 0.112 mm (=0.095+0.017 mm).

Note that, in the example shown in FIG. 6 as well, if the dimension of an individual area, e.g., length L1 of the optical path from light source lamp 51 to outgoing-light side surface 603a of the liquid crystals of liquid crystal cell 604, is changed, the light diffusion angle will change accordingly, and consequently, the amount of light diffused at the outgoing-light surface of outgoing-light side polarizing plate 650 will also vary. Therefore, the amount of changes in gap G between the translucent segments of the light-shielding mask caused by the changes in the thickness of the electrode substrate will also vary.

Note that gap G between the translucent segments of outgoing-light side light-shielding masks 622 and 650 in each of the above examples is applicable to the data projection liquid crystal display device to be used when the camera is in the normal mode. For a data projection liquid crystal display device to be used in the panorama mode, gap G is generally set at 0.04 mm. In either case, an excellent projection image can be obtained if the method according to the invention is used to determine the gaps between the translucent segments of the light-shielding mask according to the thickness of the outgoing-light side electrode substrate of the liquid crystal cell, or according to the thickness of the outgoing-light side electrode substrate and the outgoing-light side polarizing plate of the liquid crystal cell.

As explained above, the data projection device for cameras according to the invention uses a configuration in which a light-shielding mask is positioned on the outgoing-light side of the liquid crystal cell of the data projection liquid crystal display device, and the gaps between translucent segments formed on the light-shielding mask are determined according to the thickness of the electrode substrate positioned between the liquid crystal surface of the liquid crystal cell and the light-shielding mask on the outgoing-light side, or according to the thicknesses of the electrode substrate and the outgoing-light side polarizing plate.

Therefore, since the light-shielding mask is positioned on the outgoing-light side of the liquid crystal panel, the invention can reliably eliminate unnecessary light from the light that has passed through the liquid crystal panel. It is also possible to reliably prevent deterioration in the definition of the projected data stemming from the light diffusion that is caused when light is passing through the electrode substrate on the outgoing-light side of the liquid crystal panel, or the electrode substrate and the outgoing-light side polarizing plate. Therefore, manufacturability and yield of the liquid crystal panel can be improved by making the electrode substrates thicker while maintaining the quality of the projected image.

What is claimed is:

1. A data projection device for a camera, said data projection device positioned in a light path for guiding light emitted from a light source to a data-projection area, said data projection device comprising a liquid crystal cell, said liquid cell comprising an incoming-light side electrode substrate, an outgoing-light side electrode substrate, and a plurality of liquid crystals sealed between said electrode substrates, said liquid crystal cell for forming a data pattern to be projected onto the surface of a photographic film as a translucent area according to an orientation of said liquid crystals, said data projection device further comprising:

a light-shielding mask positioned in an optical path between said photographic film positioning area and said liquid crystal cell, said mask comprising an area overlapping a data pattern formation area of said liquid crystal cell, said overlapping area comprising a plurality of translucent segments and a plurality of gaps separating adjacent segments; and wherein a dimension of each said gap is proportional to an amount of light diffused in accordance with a thickness of said outgoing-light side electrode substrate.

2. A data projection device as in claim 1 wherein said light-shielding mask is formed on a surface of said outgoing-light side electrode substrate.

3. A data projection device as in claim 1 further comprising a polarizing plate positioned on a surface of said outgoing-light side electrode substrate, wherein said light-shielding mask is formed on an outgoing-light side of said polarizing plate, and wherein said dimension of each gap separating adjacent segments is proportional to an amount of light diffused in accordance with a thickness of said outgoing-light side electrode substrate and a thickness of said polarizing plate.

4. A data projection device as in claim 1 wherein said dimension of each gap is proportional to an amount of light diffused for a translucent segment located furthest from an optical axis of light emitted by said light source.

5. A data projection device as in claim 4 wherein said light-shielding mask is formed on a surface of said outgoing-light side electrode substrate.

6. A data projection device as in claim 4 further comprising a polarizing plate positioned on a surface of said outgoing-light side electrode substrate, wherein said light-shielding mask is formed on an outgoing-light side of said polarizing plate, and wherein said dimension of each gap separating adjacent segments is proportional to an amount of light diffused in accordance with a thickness of said outgoing-light side electrode substrate and a thickness of said polarizing plate.

7. A method of forming a data projection device for a camera, said data projection device positioned in a light path for guiding light emitted from a light source to a data-projection surface of photographic film positioned in a film positioning area, said data projection device comprising a liquid crystal cell, said liquid cell comprising an incoming-light side electrode substrate, an outgoing-light side electrode substrate, and a plurality of liquid crystals sealed between said electrode substrates, said liquid crystal cell for forming a data pattern to be projected onto said data projection surface of said photographic film as a translucent area according to an orientation of said liquid crystals, said method of forming said data projection device comprising:

positioning a light-sheilding mask in an optical path between said photographic film positioning area and said liquid crystal cell, said mask comprising an area overlapping a data pattern formation area of said liquid crystal cell, said overlapping area comprising a plurality of translucent segments and a plurality of gaps separating adjacent segments; and selecting a dimension of each said gap to be proportional to an amount of light diffused in accordance with a thickness of said outgoing-light side electrode substrate.

8. A method of forming a data projection device as in claim 7 further comprising forming said light-shielding mask on a surface of said outgoing-light side electrode substrate.

9. A method of forming a data projection device as in claim 7 further comprising positioning a polarizing plate on a surface of said outgoing-light side electrode substrate, forming said light-shielding mask on an outgoing-light side of said polarizing plate, and selecting said dimension of each gap separating adjacent segments to be proportional to an amount of light diffused in accordance with a thickness of said outgoing-light side electrode substrate and a thickness of said polarizing plate.

10. A method of forming a data projection device as in claim 7 including selecting said dimension of each gap to be proportional to an amount of light diffused for a translucent segment located furthest from an optical axis of light emitted by said light source.

11. A method of forming a data projection device as in claim 10 further comprising forming said light-shielding mask on a surface of said outgoing-light side electrode substrate.

12. A method of forming a data projection device as in claim 10 further comprising positioning a polarizing plate on a surface of said outgoing-light side electrode substrate, forming said light-shielding mask on an outgoing-light side of said polarizing plate, and selecting said dimension of each gap separating adjacent segments to be proportional to an amount of light diffused in accordance with a thickness of said outgoing-light side electrode substrate and a thickness of said polarizing plate.

* * * * *

UNITED STATES PATENT AND TRADEMARK OFFICE
CERTIFICATE OF CORRECTION

PATENT NO.    : 5,897,185
DATED         : April 27, 1999
INVENTOR(S)   : Hitoshi Hasegawa It is certified that an error appears in the above identified patent and that said Letters Patent is hereby corrected as shown below:

Column 12, line 14, change "sheilding" to --shielding--.

Signed and Sealed this

Twelfth Day of October, 1999

Q. TODD DICKINSON

Attest:

Attesting Officer

Acting Commissioner of Patents and Trademarks